(12) United States Patent
Darak et al.

(10) Patent No.: US 10,990,654 B1
(45) Date of Patent: Apr. 27, 2021

(54) AGE-BASED APP LOCK

(71) Applicant: Symantec Corporation, Mountain View, CA (US)

(72) Inventors: Anand Darak, Maharashtra (IN); Anuradha Joshi, Maharashtra (IN)

(73) Assignee: NortonLifeLock, Inc., Tempe, AZ (US)

( * ) Notice: Subject to any disclaimer, the term of this patent is extended or adjusted under 35 U.S.C. 154(b) by 196 days.

(21) Appl. No.: 16/142,779

(22) Filed: Sep. 26, 2018

(51) Int. Cl.
| | |
|---|---|
| *G06F 21/12* | (2013.01) |
| *G06F 21/32* | (2013.01) |
| *G06F 21/10* | (2013.01) |
| *G06K 9/00* | (2006.01) |
| *G06F 21/62* | (2013.01) |

(52) U.S. Cl.
CPC .......... *G06F 21/121* (2013.01); *G06F 21/105* (2013.01); *G06F 21/32* (2013.01); *G06F 21/629* (2013.01); *G06K 9/00221* (2013.01); *G06F 2221/0735* (2013.01)

(58) Field of Classification Search
CPC ...... G06F 21/121; G06F 21/32; G06F 21/105; G06F 21/629; G06F 2221/0735; G06K 9/00221
See application file for complete search history.

(56) References Cited

U.S. PATENT DOCUMENTS

| | | | | |
|---|---|---|---|---|
| 5,781,650 A * | 7/1998 | Lobo | ................... | G06K 9/00221 382/118 |
| 8,572,707 B2 * | 10/2013 | Tuchman | ............ | H04L 63/0861 726/7 |
| 9,763,096 B2 * | 9/2017 | Li | .......................... | G06F 3/0481 |
| 10,402,037 B1 * | 9/2019 | Van Gorkom | ..... | G06Q 30/0267 |
| 2003/0039380 A1 * | 2/2003 | Sukegawa | .......... | G06K 9/00288 382/118 |
| 2006/0184800 A1 * | 8/2006 | Rosenberg | ............... | G07C 9/37 713/186 |
| 2007/0288758 A1 * | 12/2007 | Weiss | .................... | H04L 9/3231 713/186 |

(Continued)

OTHER PUBLICATIONS

Simonte, "Facial Recognition Lets Apps guess Your Age", https://www.technologyreview.com/s/427381/facial-recognition-lets-apps-guess-your-age/, MIT Technology Review, Apr. 2, 2012, 4 pgs.

*Primary Examiner* — Jung W Kim
*Assistant Examiner* — Thomas Ho
(74) *Attorney, Agent, or Firm* — Brill Law Office; Jeffrey Brill

(57) ABSTRACT

An entity runs in background mode on a computing device and automatically determines when the current user is attempting to open an age-restricted app. The age of the user is automatically determined, e.g., by passively capturing a biometric image and estimating the user's age. A camera on the computing device can be used to take a picture of the user, and a facial image can be recognized in the picture by applying a facial recognition algorithm. The age of the user can be estimated based on the facial image, by applying an age estimation algorithm. The app is locked responsive to determining that the user's age does not meet a corresponding requirement. A communication can be transmitted to the primary user of the computing device, indicating that the current user of the device unsuccessfully attempted to open the app, optionally including a picture of the user.

20 Claims, 4 Drawing Sheets

(56) References Cited

U.S. PATENT DOCUMENTS

| | | | |
|---|---|---|---|
| 2010/0251336 A1* | 9/2010 | Allen, Jr. | G06F 21/316 |
| | | | 726/4 |
| 2012/0036440 A1* | 2/2012 | Dare | H04L 29/06 |
| | | | 715/734 |
| 2012/0253810 A1* | 10/2012 | Sutton | G10L 17/24 |
| | | | 704/246 |
| 2013/0097659 A1* | 4/2013 | Das | H04W 12/08 |
| | | | 726/1 |
| 2013/0254660 A1* | 9/2013 | Fujioka | A63F 13/12 |
| | | | 715/707 |
| 2015/0089668 A1* | 3/2015 | Baldwin | H04L 67/18 |
| | | | 726/28 |
| 2015/0148007 A1* | 5/2015 | Mitchell | H04W 12/1206 |
| | | | 455/411 |
| 2018/0226079 A1* | 8/2018 | Khoury | G06K 9/6267 |

\* cited by examiner

AGE-BASED APP LOCK

TECHNICAL FIELD

This disclosure pertains generally to computing device security, and more specifically to locking apps on mobile computing devices dynamically, based on the age of the current user.

BACKGROUND

Apps on mobile computing devices (e.g., smartphones, tablets, smart watches, etc.) fall in different categories. Not all categories of apps are appropriate for all age groups. App end user license agreements or other descriptive information may explicitly define (or informally suggest) minimum age or appropriate age range for use. For example, some mobile games may be designated as appropriate for adults or mature teenagers, but not for pre-teens or younger children. Many social apps have a minimum age of 13 for use. Banking applications would typically only be appropriate for use by the owner of the associated bank account, typically an adult.

Mobile devices are often shared among family members of varying ages. For example, parents might allow their children to use their devices to play games, show certain content, watch age appropriate video, etc. Conventional app locking techniques are too restrictive for use in this context. Such conventional locking technology locks specific apps outright, such as those requiring the highest level of privacy (e.g., financial or dating apps), and requires an identification of the primary user of the device through biometrics, a passcode, or the like to unlock these apps.

As noted above, apps demand different privacy scopes across different age ranges based on type. For example, social apps, banking apps and dating apps demand a high level of privacy. Utility apps, music apps, and the like can generally be more safely shared across age ranges. Gaming apps, depending on the type of game, may or may not be appropriate to share among users of different ages. Thus, there are certain apps that may be safely shared with users of all ages, and others which should be shared only among users of specific age groups.

It would be desirable to address these issues.

SUMMARY

An age-based app locking manager runs in background mode on a computing device (e.g., a smartphone, laptop computer, etc.), and automatically determines when the current user is attempting to open a specific app that is subject to age-based locking. Which apps on the computing device are subject to age-based locking can be determined by defaults based on app type (e.g., dating apps, financial apps, gaming apps and social apps could be subject to age-based-locking, but not news apps or music players). The owner/primary user of the computing device can also specify which apps to subject to age-based blocking at the level of individual apps, app type, etc., for example in response to prompting via a graphical user interface. In some embodiments, apps with age restrictions specified in the corresponding end user license agreement (EULA) are automatically subject to age-based locking. Minimum age or age range for use of apps subject to age-based locking can be set by default based on EULA, app type, etc., or can be selected by the primary user, for example in response to prompting.

When it is determined that the current user is attempting to open a specific app that is subject to age-based locking, the age-based app locking manager, still running in background mode, can automatically determine the age of the current user. In some embodiments, this determination of the user's age is made by passively capturing a biometric image of the current user, and estimating the user's age based on the biometric image. For example, the onboard camera of the computing device can be used to take a picture or video of the current user, and a facial image can be recognized in the picture or video (for example, by applying a facial recognition algorithm). The age of the user can be estimated based on the facial image, for example by applying an age estimation algorithm to the facial image. In another embodiment, the onboard microphone of the computing device is used to create an audio image of the current user, and the age is estimated based on the audio image.

In response to determining that the age of the current user does not meet an age requirement for running the specific app, the specific app can be locked, thereby preventing the current user from accessing it. In some embodiments, the user can be provided with an opportunity to perform a secondary authentication to verify whether the user meets the age requirement, for example based on the user's social security number or the like. When to provide a user determined not to meet an age requirement with a secondary authentication opportunity can vary between embodiments. In some embodiments, a user can be provided with the opportunity to perform the secondary authentication to verify his/her age in response to the estimated age of the user being within a specific range of the age requirement for running the app. For example, a user estimated to be 12 could be given an opportunity to attempt to prove that they are really 13, but a user estimated to be 5 would could be blocked outright.

When the app is locked, in some embodiments a message is displayed to the current user of the computing device indicating that the app is being locked based on age. It is also possible to transmit an electronic communication to the primary user of the computing device, indicating that the current user of the computing device unsuccessfully attempted to open the specific app. A picture of the current user can be included in such a communication to the primary user.

In some embodiments, known users can be registered on the computing device, in which case their verified age can be associated with a biometric identifier, such as a fingerprint, retina scan, etc. In response to determining that the estimated age of the current user does not meet the age requirement for running the specific app, the biometric identifier of the current user can be passively captured, and compared to biometric identifiers of the registered users. In response to determining that the current user is a registered user, the verified age of the current registered user associated with the biometric identifier is used to determine whether the current user meets the age requirement for running the specific app.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
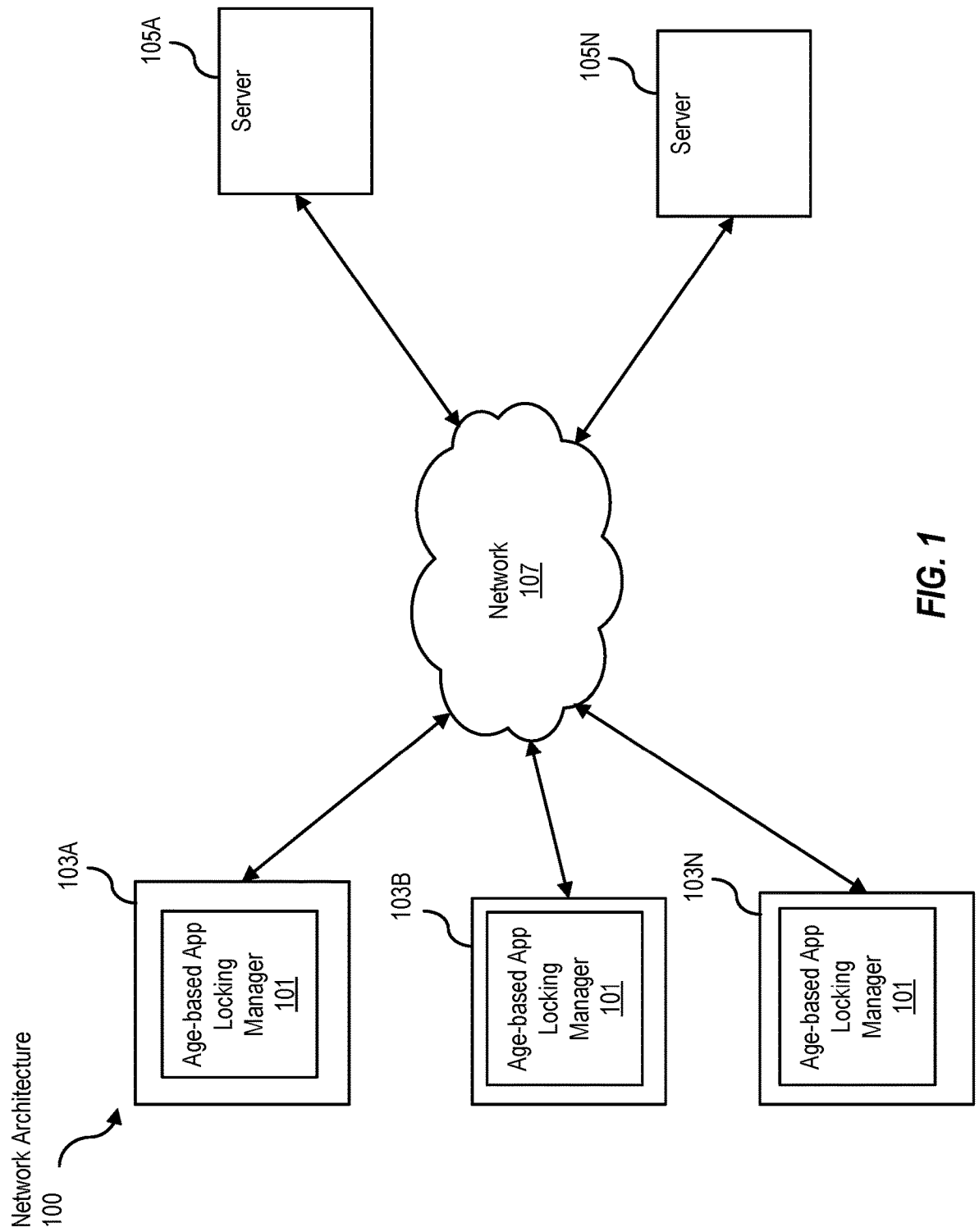
FIG. 1 illustrates a network architecture in which an age-based app locking manager can operate, according to some embodiments.

FIG. 1 is a block diagram illustrating an exemplary network architecture 100 in which an age-based app locking manager 101 can be implemented. The illustrated network architecture 100 comprises multiple clients 103A, 103B and 103N, as well as multiple servers 105A and 105N. In FIG. 1, an age-based app locking manager 101 is illustrated as residing on each client 103A-N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of mobile computing devices, comprising portable computer systems capable of connecting to a network 107 and running applications (e.g., smartphones, tablet computers, wearable computing devices, etc.). Clients may also be in the form of laptops, desktops and/or other types of computers/computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
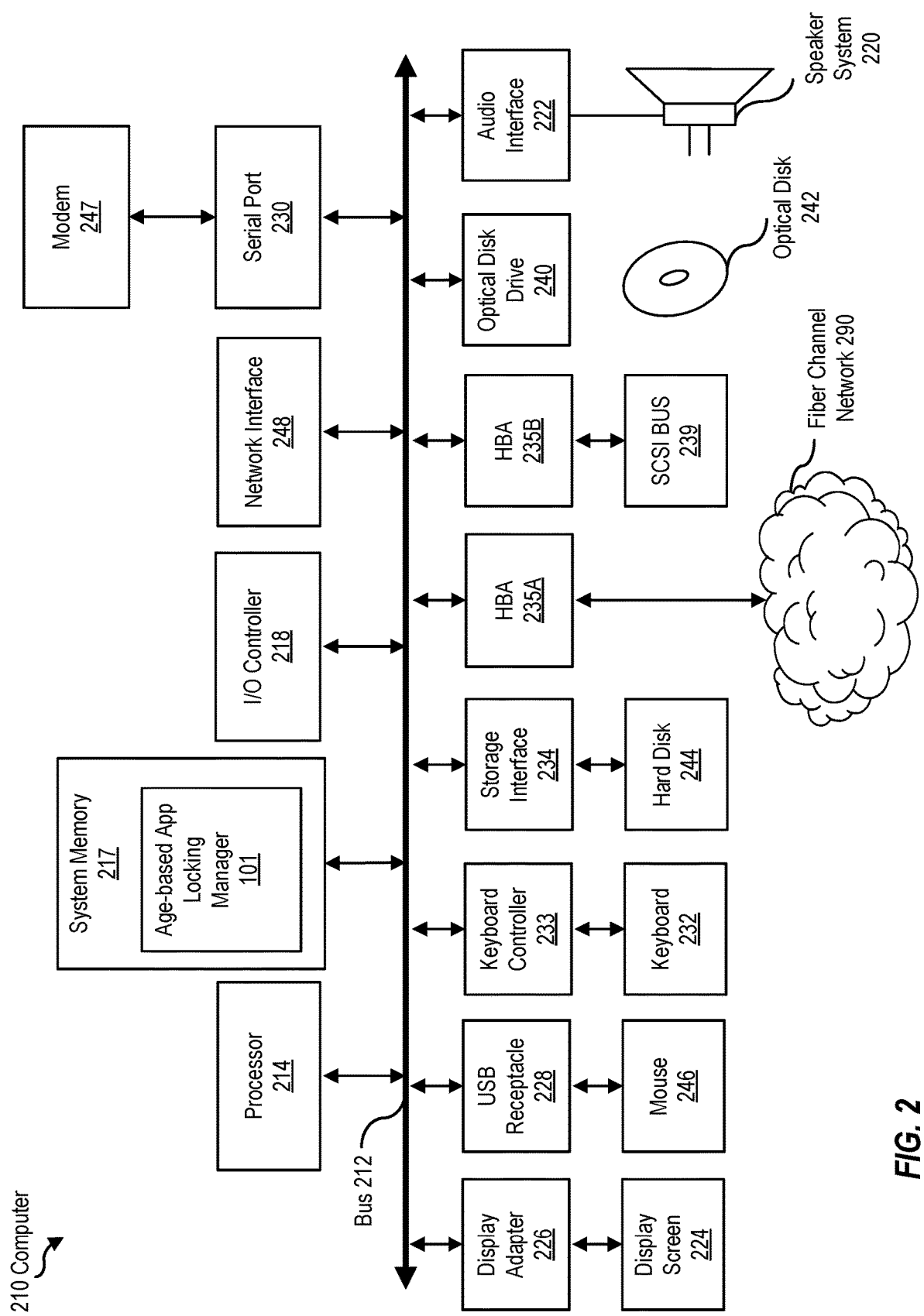
FIG. 2 is a block diagram of a computer system suitable for implementing an age-based app locking manager, according to some embodiments.

FIG. 2 is a block diagram of a computer system 210 suitable for implementing an age-based app locking manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the age-based app locking manager 101 is illustrated as residing in system memory 217. The workings of the age-based app locking manager 101 are explained in greater detail below in conjunction with FIGS. 3-5.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
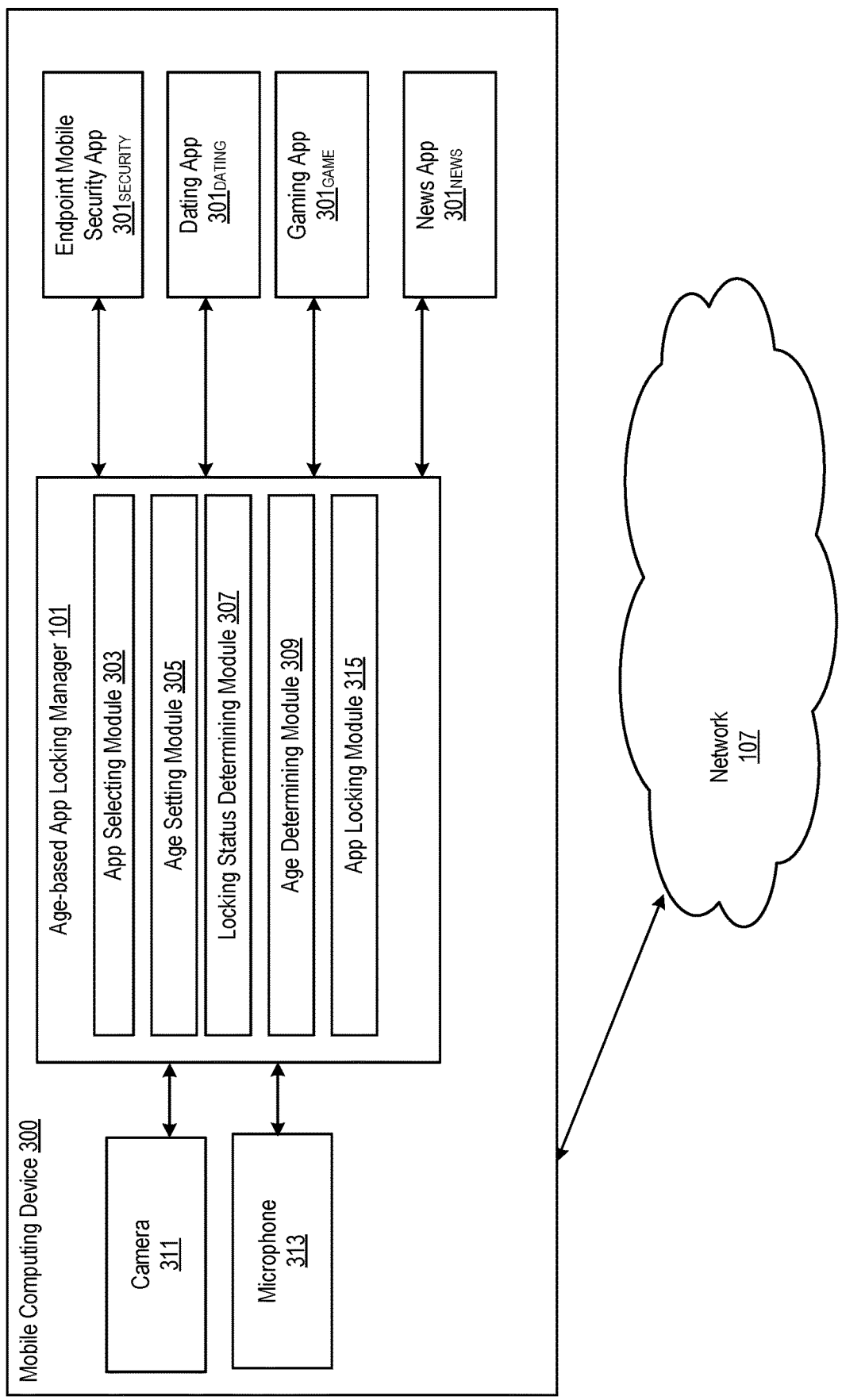
FIG. 3 is a block diagram of an age-based app locking manager operating on a computing device in a networked environment, according to some embodiments.

FIG. 3 illustrates the operation of an age-based app locking manager 101, according to some embodiments. As described above, the functionalities of the age-based app locking manager 101 can reside on a client 103, a server 105, or be distributed between multiple computer systems 210, including within a cloud-based computing environment in which the functionality of the age-based app locking manager 101 is provided as a service over a network 107.

FIG. 3 illustrates a specific multiple module instantiation of an age-based app locking manager 101, according to some embodiments. It is to be understood that although the age-based app locking manager 101 is illustrated as a single entity, the illustrated age-based app locking manager 101 represents a collection of functionalities, which can be instantiated as a single or multiple modules as desired (an instantiation of specific, multiple modules of the age-based app locking manager 101 according to one embodiment is illustrated in FIG. 3). It is to be understood that the modules of the age-based app locking manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the age-based app locking manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 4:
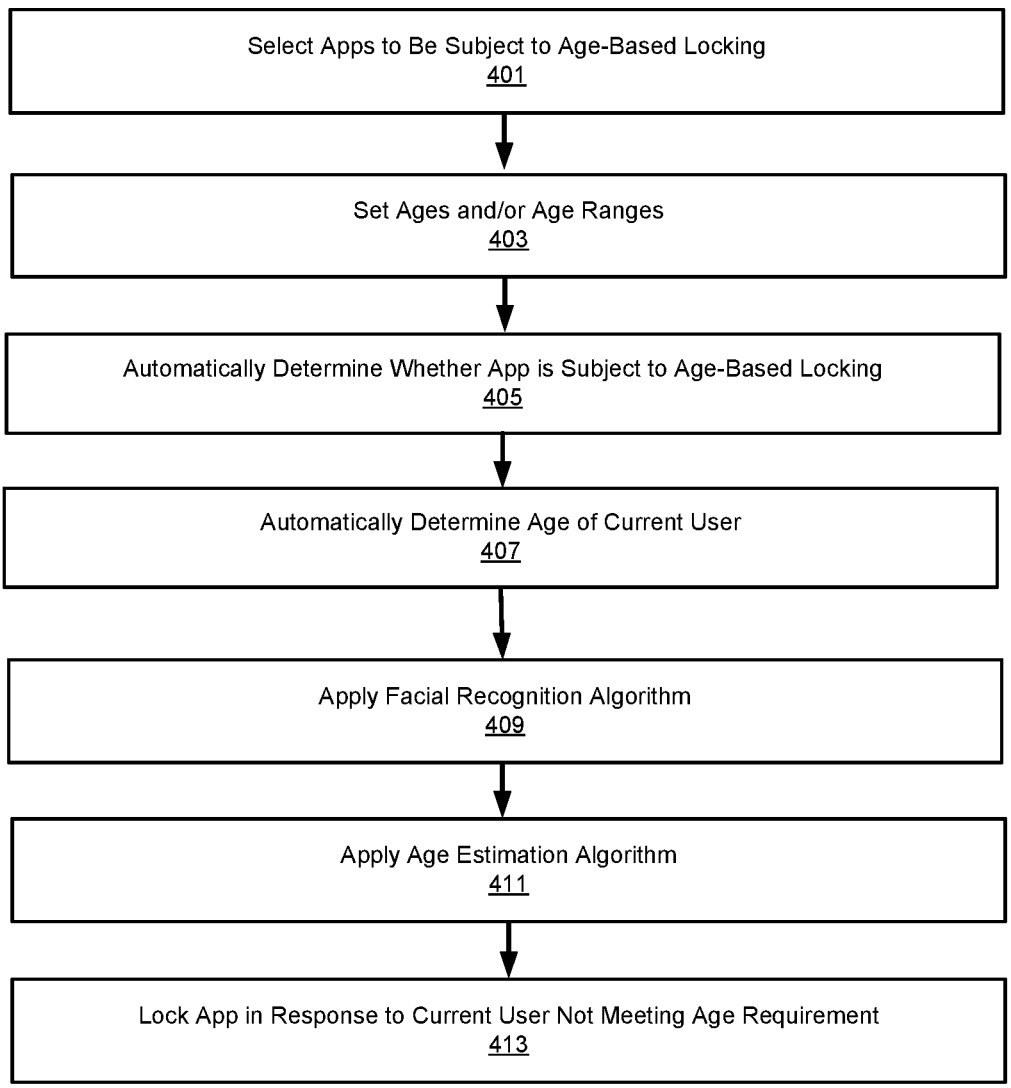
FIG. 4 is a flowchart illustrating operations of an age-based app locking manager, according to some embodiments.

FIG. 4 illustrates steps executed by the age-based app locking manager 101, according to some embodiments. For clarity of description, the subject matter illustrated in FIGS. 3 and 4 is described together below.

In the embodiment illustrated in FIG. 3, an age-based app locking manager 101 runs on a mobile computing device 300, such as a smartphone or tablet, which may be connected to a network 107. In one embodiment, the age-based app locking manager 101 is implemented in the form of an app 301 which runs on the mobile computing device 300 (e.g., an Android app, an iOS app, etc.). In other embodiments, the age-based app locking manager 101 can run on other types of computing devices, such as laptops or desktops. In some embodiments, the age-based app locking manager 101 is instantiated as part of or otherwise in conjunction with an endpoint mobile security app $301_{SECURITY}$, which may in turn interface with a backend/cloud based security system (not illustrated).

Various apps 301 (or other types of applications) are installed on the mobile computing device 300 (or other type of computing device) on which the age-based app locking manager 101 is present. As described in detail below, the age-based app locking manager 101 is able to provide age-based app locking for mobile (or other) endpoints, for example by using facial recognition and corresponding age estimation of users attempting to run apps 301.

The primary user (e.g., owner) of the mobile device 300 can interact with an app selecting module 303 of the age-based app locking manager 101 to select 401 apps 301 to be subject to age-based locking. For example, the app selecting module 303 can display a list of all apps 301 installed on the mobile device 300 to the primary user, who can in turn select which ones are to be subject to age-based locking. In some embodiments, when a new app 301 is installed on the device 300, the app selecting module 303 automatically prompts the user to specify whether the new app 300 is to be subject to age-based locking.

In some embodiments, the apps 301 on the device 300 are further categorized by type, such as social, financial, dating, gaming, news, music players, video players, utilities, search engines, etc. Such grouping can be performed at any desired level of granularity. The primary user can make app locking selections at the level of app type (e.g., subject all dating apps $301_{DATING}$ to age-based locking, but not news apps $301_{NEWS}$), as well as at the level of individual apps 301.

In some embodiments the user can apply age-based app locking to groups of apps 301 according to criteria other than app type, such as privacy sensitivity, age restriction specified in the corresponding end user license agreement (EULA), etc. User specified type and other group-level directives can also be automatically applied to apps 301 of a given type that are installed after the directives have been issued. Default locking status for apps 301 based on group-level or other characteristics can also be applied, which can in turn be overwritten based on user input.

For apps 301 subject to age-based locking, an age setting module 305 of the age-based app locking manager 101 sets 403 specific ages and/or age ranges. In some embodiments, the age setting module 305 can set the minimum age for use of the app 301 to the value specified by the app's EULA or other publisher provided information. Ages or age ranges for use may instead or in addition may be specified by the owner/primary user of the device, e.g., through a user interface, at a specific app and/or app group/type level, etc.

Once the apps 301 for which age-based locking is to be applied are selected and the ages/age ranges are set, the age-based app locking manager 101 runs in the background. When a user of the mobile device 300 attempts to open an app 301, a locking status determining module 307 of the age-based app locking manager 101 automatically determines 405 whether the app 301 in question is subject to age-based locking. If it is not, the age-based app locking manager 101 takes no action, and the user opens the 301 without being made aware of the presence of the age-based app locking manager 101.

On the other hand, if the app 301 that the user is attempting to open is subject to age-based locking, an age determining module 309 of the age-based app locking manager 101 automatically determines 407 the age of the user. It is to be understood that this determination can be made by the age determining module 309 while the age-based app locking manager 101 is running in background mode, without prompting or otherwise disturbing the user. In one embodiment, the age determining module 309 uses the onboard camera 311 on the mobile device 300 to take a picture or video of the user currently operating the mobile device 300. The age determining module 309 can then apply 409 a facial recognition algorithm to the picture or video, and apply an algorithm to the recognized face to estimate 411 the age of the user. A variety of facial recognition algorithms are known to those of ordinary skill in the art, and can be applied in this context.

Facial recognition algorithms can identify faces in digital images and/or video frames by applying various techniques, such as identifying specific facial features by extracting landmarks, or features, from an image, for example analyzing relative position, size, and/or shape of the eyes, nose, cheekbones, jaw, etc. These identified features can then be used to search for other images with matching features. Instead of or in addition to geometric approaches which look at distinguishing features, algorithms can apply a photometric statistical approach that distills an image into values and compares the values with templates to eliminate variances. Some examples of facial recognition algorithms and techniques that can be utilized by the age determining module 309 are principal component analysis using eigenfaces, linear discriminant analysis, elastic bunch graph matching using the Fisherface algorithm, the hidden Markov model, multilinear subspace learning using tensor representation, and neuronal motivated dynamic link matching. In some embodiments three-dimensional facial recognition techniques are used, and/or skin texture analysis.

In order to estimate the age of the user based on the facial recognition, the age determining module 309 can apply an age estimation algorithm to the facial image. A variety of age estimation algorithms are known to those of ordinary skill in the art, and can be applied to the facial image in this context. Age estimation algorithms can estimate the age of the subject of the facial image based on a variety of factors, such as geometric measures and texture analysis. Although the age estimation algorithm does not necessarily identify the exact age of the user, the generated estimate is within a margin of error suitable for use within the context of age-based locking. Thus, it is to be understood that as the term is used herein, a determined age of the user need not mean the exact biological age of the subject, but instead can mean the estimated age determined by the age determining module 309, for example by applying an age estimation algorithm to a facial image. Such techniques are accurate enough to place the user within an age range (e.g., child, under 13, teenager, adult) that is useful for age-based locking of apps 301. In other embodiments, the age determining module 309 determines the age of the user in other ways, for example based on an audio image of the current user captured passively via the microphone 313 on the mobile phone 300, or based on other types of passively captured biometric data.

If the user attempting to open the app 301 for which age-based locking is being applied meets the corresponding age requirement (e.g., minimum age or app range to access the app 301), the age-based app locking manager 101 simply lets the app 301 run without bothering the user. Since all of this occurs in the background, the user need not even be aware that the age checking occurred. However, if the user in question does not meet the age requirement, an app locking module 315 of the age-based app locking manager 101 locks 413 the app 301 (e.g., prevents the app 301 from running), thereby blocking the underage user for accessing the unauthorized app 301. It is to be understood that as the term as used herein "locking" an app 301 means making the app 301 inaccessible to the current user. In different embodiments, apps 301 can be locked in different ways, for example at an operating system level, by preventing the app 301 from opening, etc.

In some embodiments the app locking module 315 takes additional action(s), such as displaying a message to the user attempting to open the age-restricted app 301. Such a message could indicate, for example, that the app 301 is being locked because the age requirement is not met. The exact content to include in such a message is a variable design parameter, and in some embodiments can be configured via the age-based app locking manager 101 by the primary user/owner of the mobile device 300. The app locking module 315 may also optionally take other steps, such as transmitting an electronic communication to the primary user/owner of the mobile device 300 (e.g., a text, email, phone call, etc.), and informing him/her that the user has unsuccessfully attempted to access the given age-restricted app 301. A picture of the blocked user may be included in such a communication.

In some embodiments, if the initial age determination indicates that the user does not meet the age requirement, the age-based app locking manager 101 can take additional authentication measures in order to mitigate false positives. For example, a secondary authentication of the user's age could be performed, using factors such as social security number. The specific requirements for successful secondary authentication can vary between embodiments. When to provide the user with the opportunity to attempt age verification via secondary authentication is also a variable design parameter. For example, in one embodiment secondary authentication would only be attempted where the estimated age is within a specific range to the required age for use of the app 301, such as a year or two. Thus, for example in order to open a social app $301_{SOCIAL}$ with a minimum age of 13, a user estimated to be 12 would be given an opportunity to attempt to prove that they are really 13, but a user estimated to be 5 would just be blocked outright.

In some embodiments, certain users can be registered with the age-based app locking manager 101, so that that false positives can be mitigated by using a biometric (or other form of) identifier that can be gleaned in the background to look up a corresponding profile, and verify the registered user's age that way. For example, if the owner/primary user of a mobile device 300 sometimes shares the device 300 with various ones of his/her children, the owner could create profiles for each child, with a biometric identity such as a fingerprint, iris scan, retina scan, facial image, etc., and a confirmation of the actual ages of the children. In this embodiment, if the age determining module 309 determines that a user is not of the appropriate age to utilize a given app 301, the user's biometric identifier would be passively gleaned and checked against the profiles of registered users. If the user is registered with the age-based app locking manager 101, the profile would be located and the user's age verified. As described above, if the user meets the age requirement, the use of the app 301 is not blocked, but if the user does not, the age-based app locking manager 101 blocks the user's attempt to open the app 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for dynamically locking apps on a computing device by an age-based app locking manager running in background mode on the computing device, based on an age of a current user, the method comprising the following steps:

a locking status determining module of the age-based app locking manager running in background mode on the computing device automatically determining that the current user of the computing device is attempting to open a specific app that is subject to age-based locking;

the locking status determining module automatically communicating a notification to an age determining module of the age-based app locking manager running in background mode on the computing device, the notification indicating that the current user of the computing device is attempting to open the specific app that is subject to age-based locking;

the age determining module automatically determining the age of the current user, in response to receiving the notification from the locking status determining module indicating that the current user is attempting to open the specific app that is subject to age-based locking;

the age determining module automatically communicating a notification to an app locking module of the age-based app locking manager running in background mode on the computing device, the notification indicating that the age of the current user does not meet an age requirement for running the specific app;

the age-based app locking manager automatically locking the specific app, thereby preventing the current user from accessing the specific app, in response to receiving the notification from the age determining module indicating that that the age of the current user does not meet the age requirement for running the specific app;

the age determining module determining that an estimated age of the current user is within a specific range of the age requirement for running the app; and the age-based app locking manager running in background mode on the computing device providing the current user the opportunity to perform a secondary authentication to verify whether the current user meets the age requirement, in response to the estimated age of the current user being within the specific range of the age requirement for running the app.

2. The method of claim 1 wherein a locking status determining module of the age-based app locking manager running in background mode on the computing device automatically determining the age of the current user further comprises:

passively capturing a biometric image of the current user of the computing device; and estimating the age of the current user based on the biometric image.

3. The method of claim 1 wherein a locking status determining module of the age-based app locking manager running in background mode on the computing device automatically determining the age of the current user further comprises:

using an onboard camera of the computing device to take a picture or video of the current user of the computing device;

recognizing a facial image in the picture or video of the current user; and estimating the age of the current user based on the facial image.

4. The method of claim 3 wherein recognizing a facial image in the picture or video of the current user further comprises:

applying a facial recognition algorithm to the picture or video.

5. The method of claim 3 wherein estimating the age of the current user based on the facial image further comprises:

applying an age estimation algorithm to the facial image.

6. The method of claim 1 wherein a locking status determining module of the age-based app locking manager running in background mode on the computing device automatically determining the age of the current user further comprises:

using an onboard microphone of the computing device to create an audio image of the current user of the computing device; and estimating the age of the current user based on the audio image.

7. The method of claim 1 further comprising:

in response to determining that the age of the current user does not meet the age requirement for running the specific app, displaying a message to the current user of the computing device indicating that the app is being locked based on the age of the current user.

8. The method of claim 1 further comprising:

in response to determining that the age of the current user does not meet the age requirement for running the specific app, transmitting an electronic communication to a primary user of the computing device, indicating that the current user of the computing device unsuccessfully attempted to open the specific app.

9. The method of claim 8 further comprising:

including a picture of the current user of the computing device in the electronic communication to the primary user of the computing device.

10. The method of claim 1 further comprising:

prompting a primary user of the computing device to select which apps on the computing device to subject to age-based locking;

receiving, from the primary user, selections of which apps on the computing device to subject to age-based locking; and subjecting the selected apps to age-based locking on the computing device.

11. The method of claim 1 further comprising:

receiving, from the primary user, selections of which types of apps on the computing device to subject to age-based locking; and subjecting the selected app types to age-based locking on the computing device.

12. The method of claim 1 further comprising:

automatically subjecting apps of default types to age-based locking on the computing device.

13. The method of claim 1 further comprising:

automatically subjecting apps with end user license agreements (EULAs) containing age-based restrictions to age-based locking on the computing device.

14. The method of claim 1 further comprising:

automatically setting a minimum age or age range for use of a given app with an end user license agreement (EULA) containing age-based restrictions to a minimum age or age range specified by the EULA.

15. The method of claim 1 further comprising:

prompting a primary user of the computing device to select minimum ages or age ranges for apps subject to age-based locking;

receiving, from the primary user, selections of minimum ages or age ranges for apps subject to age-based locking; and setting minimum ages or age ranges for use of the apps subject to age-based locking to the selections of minimum ages or age ranges received from the primary user.

16. The method of claim 1 further comprising:

registering at least one user by associating a verified age with a biometric identifier;

in response to determining that the age of the current user does not meet the age requirement for running the specific app, passively capturing a biometric identifier of the current user;

comparing the captured biometric identifier of the current user to at least one biometric identifier of the at least one registered user; and in response to determining that the current user is a registered user, utilizing the verified age of the current registered user associated with the biometric identifier to determine whether the current user meets the age requirement for running the specific app.

17. At least one non-transitory computer readable storage medium for dynamically locking apps on a computing device by an age-based app locking manager running in background mode on the computing device, based on an age of a current user, the at least one non-transitory computer readable storage medium storing computer executable instructions that, when loaded into computer memory and executed by at least one processor of the computing device, cause the computing device to perform the following steps:

a locking status determining module of the age-based app locking manager running in background mode on the computing device automatically determining that the current user of the computing device is attempting to open a specific app that is subject to age-based locking;

the locking status determining module automatically communicating a notification to an age determining module of the age-based app locking manager running in background mode on the computing device, the notification indicating that the current user of the computing device is attempting to open the specific app that is subject to age-based locking;

the age determining module automatically determining the age of the current user, in response to receiving the notification from the locking status determining module indicating that the current user is attempting to open the specific app that is subject to age-based locking;

the age determining module automatically communicating a notification to an app locking module of the age-based app locking manager running in background mode on the computing device, the notification indicating that the age of the current user does not meet an age requirement for running the specific app;

the age-based app locking manager automatically locking the specific app, thereby preventing the current user from accessing the specific app, in response to receiving the notification from the age determining module indicating that that the age of the current user does not meet the age requirement for running the specific app;

the age determining module determining that an estimated age of the current user is within a specific range of the age requirement for running the app; and the age-based app locking manager running in background mode on the computing device providing the current user the opportunity to perform a secondary authentication to verify whether the current user meets the age requirement, in response to the estimated age of the current user being within the specific range of the age requirement for running the app.

18. A computer-implemented method for dynamically locking apps on a computing device, based on an age of a current user, the method comprising the following steps:

registering at least one user by associating a verified age with a biometric identifier;

automatically determining that the current user of the computing device is attempting to open a specific app that is subject to age-based locking, by an entity running in background mode on the computing device;

automatically determining the age of the current user, by the entity running in background mode on the computing device;

in response to determining that the age of the current user does not meet an age requirement for running the specific app, locking the specific app, thereby preventing the current user from accessing the specific app;

in response to determining that the age of the current user does not meet the age requirement for running the specific app, passively capturing a biometric identifier of the current user;

comparing the captured biometric identifier of the current user to at least one biometric identifier of the at least one registered user; and in response to determining that the current user is a registered user, utilizing the verified age of the current registered user associated with the biometric identifier to determine whether the current user meets the age requirement for running the specific app.

19. The method of claim 18 wherein automatically determining the age of the current user by the entity running in background mode on the computing device further comprises:

in response to determining that the age of the current user does not meet the age requirement for running the specific app, providing the user an opportunity to perform a secondary authentication to verify whether the user meets the age requirement.

20. The method of claim 19 wherein providing the user an opportunity to perform a secondary authentication to verify whether the user meets the age requirement further comprises:

providing the user the opportunity to perform the secondary authentication to verify whether the user meets the age requirement, in response to the estimated age of the user being within a specific range of the age requirement for running the specific app.

* * * * *